April 19, 1938.  M. E. HENNING  2,114,740
AUTOMATIC SWITCH WITH DEFROST AND QUICK FREEZE ADJUSTMENTS
Filed Nov. 24, 1933  2 Sheets-Sheet 1

KNOB AT DEFROST

KNOB AT 5

Inventor
Malcolm E. Henning
By Bair, Freeman & Sinclair
Attorneys

Witness
Edw. Seeley

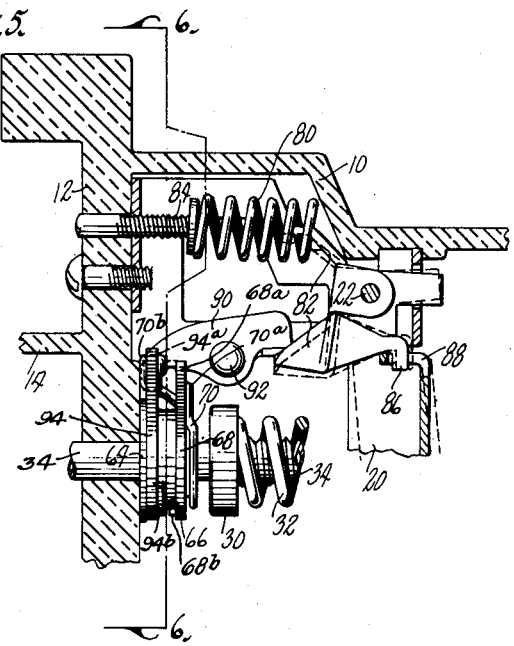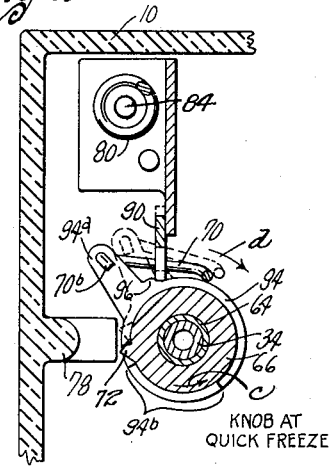

Patented Apr. 19, 1938

2,114,740

UNITED STATES PATENT OFFICE 2,114,740

AUTOMATIC SWITCH WITH DEFROST AND QUICK FREEZE ADJUSTMENTS

Malcolm E. Henning, Des Moines, Iowa, assignor to Penn Electric Switch Co., Des Moines, Iowa, a corporation of Iowa Application November 24, 1933, Serial No. 699,586

7 Claims. (Cl. 200—83)

The object of my invention is to provide an automatic switch which is simple, durable and comparatively inexpensive to manufacture.

A further object is to provide a switch automatically responsive to temperature, of a refrigerator or the like, the switch embodying a control means for securing either defrosting or quick freezing cycles of operation of the switch as desired.

A further object is to provide a switch structure having a spring loading means for the high temperature position of the temperature responsive element therein and a spring loading means for the low temperature position thereof, both of said loading means being normally inoperative but adjustable to operative positions by manually controlled elements.

A further object is to provide means for manually controlling the two loading means so that either one can operate each cycle of operation of the switch structure or can operate one cycle and then normal cycles can be automatically resumed.

Still another object is to provide a control knob for the switch structure having different positions of adjustment for the temperature responsive element of the switch and having defrost and quick freeze adjustments, each of which cause defrosting or quick freezing cycles respectively, each cycle of operation of the switch.

Another object is to provide in the switch, mechanism for manually tripping out if desired the mechanism which causes the defrosting cycle or the quick freeze cycle, the defrosting trip being so proportioned that the defrosting cycles cannot be had at lower than a predetermined temperature adjustment of the switch.

With these and other objects in view my invention consists in the construction, arrangement and combination of the various parts of my device, whereby the objects contemplated are attained, as hereinafter more fully set forth, pointed out in my claims, and illustrated in the accompanying drawings, in which Figure 1 is a side elevation of a switch structure embodying my invention and showing a cover plate removed for thereby illustrating the various parts of the switch.

Figure 5 is a view similar to Figure 2 showing the opposite side of the switch for illustrating the quick freeze mechanism.

Figure 6 is a sectional view on the line 6—6 of Figure 5, being similar to Figures 3 and 4, except showing the quick freeze mechanism only.

Figure 7 is a similar sectional view showing the parts in a different position.

Figure 8 is a front elevation of the switch structure showing the different positions of the control knob; and Figure 9 is a diagrammatic view of the control switch connected with a refrigerating system.

Figure 1:
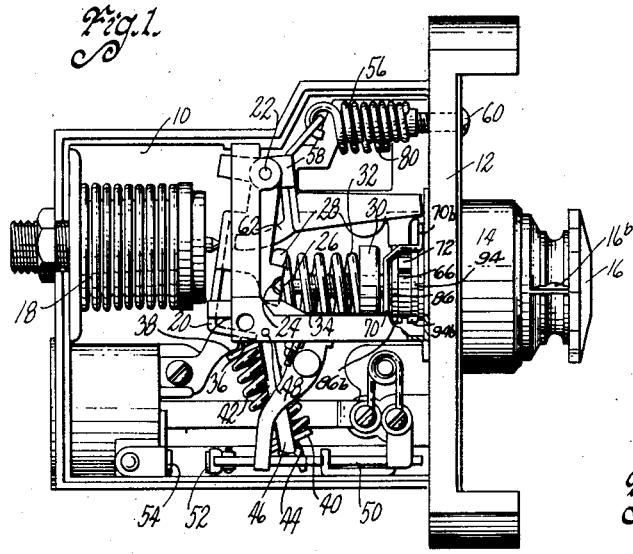

On the accompanying drawings I have used the reference numeral 10 to indicate a switch casing. It has a front wall 12 provided with a hub 14. A control knob 16 projects from the hub 14.

Located within the housing 10 is a temperature responsive element 18, responsive to the temperature in a refrigerator or the like, the switch structure being preferably provided as an automatic contol for an electrically operated refrigerator, such as illustrated in Figure 9. In this figure an electric motor is indicated at M for driving a refrigerant compressor A. A condenser coil is illustrated at C and an evaporator at E. A bulb B is responsive to the temperature of the evaporator and is connected by tubing 17 with the bellows 18.

The temperature responsive element 18 acts upon an arm 20 pivoted at 22. The arm has seats 24 in which pintles 26 of a spring cup 28 are pivoted. A second spring cup 30 is provided and a spring 32 is mounted between the spring cups to oppose expansion of the temperature responsive element 18.

The spring cup 30 is threaded on an adjusting rod 34 with which the control knob 16 is connected. Thus by rotating the rod, the temperature range of the switch may be adjusted.

The switch arm 20 is provided with a pointed element 36 seated in a washer 38. The washer 38 has interposed between it and a second washer 40 an over-center spring 42. The second washer 40 is provided with a pointed element 44 pivotally engaging the outer end of a secondary switch arm 46. The switch arm 46 is pivoted at 48.

The outer end of the secondary switch arm 46 is pivotally associated with a sliding switch bar 50 having a movable contact 52 for cooperation with a fixed contact 54. The contacts 52 and 54 are to be included in the circuit of the electric motor M driving the refrigerating mechanism controlled by the switch.

The foregoing description is of an ordinary automatic temperature switch having means for adjusting its range. I provide a defroster spring 56 for loading the switch arm 20 in its high temperature position, thus aiding the spring 32 and preventing energization of the refrigerating mechanism until a temperature within the refrigerator higher than the normally high temperature is reached.

Figure 2:
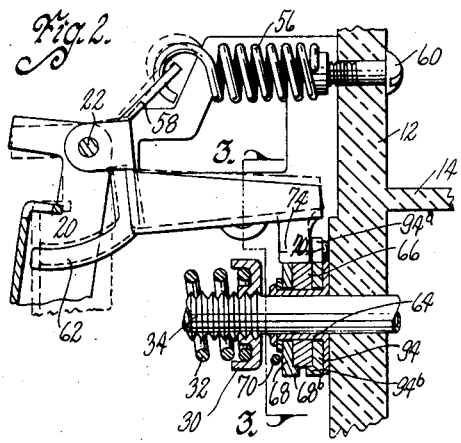
Figure 2 is an enlarged side elevation of the upper right hand portion of Figure 1, some parts being broken away and others being shown in section and different positions of the defroster mechanism being shown by solid and dotted lines.

The defroster spring 56 has one end connected with a U-shaped lever 58 pivoted on the pin 22, for constraining the lever to move in a clockwise direction with respect to Figure 2. The other end of the spring 56 is associated with an adjusting screw 60. The lever 58 has a finger 62 adapted to be engaged by the switch arm 20 when in its high temperature position, as shown by dotted lines in Figure 2 for causing a defrosting cycle of operation.

The mechanism for selectively obtaining defrosting consists of a sleeve 64 secured to the adjusting rod 34, a cam 66 secured to the sleeve, a washer 68 rotatable on the sleeve 64 and a spring 70. The cam 66 has a lobe 72 for coaction with a projection 74 of the defroster lever 58.

The washer 68 has a depression 76 for receiving the projection 74. The spring 70 has its end 70a secured to a projection 68a of the washer 68 and its other end secured as will hereinafter be described, so as to constrain the washer 68 to move in the direction of the arrows a in Figures 3 and 4, with the projection 68a against a stop shoulder 78 of the casing 10.

A quick freeze spring 80 is provided with one end bearing against a quick freeze lever 82 and its other end bearing against an adjusting screw 84. The quick freeze lever 82 is pivoted on the pin 22 (see Figure 5) and is provided with a hook-like extension 86 received in a slot 88 of the switch arm 20. The spring 80 is adapted to load the switch arm 20 in its low temperature position only by engagement of the left end of the slot 88 with the hook 86 as shown in Figure 5, when it is permitted to function by proper adjustment of the knob 16.

The quick freeze mechanism also includes a lever 90 pivoted at 92, one end of which engages the quick freeze lever 82 and the other end of which engages the periphery of a quick freeze washer 94. The washer 94 is provided with a lobe 96 and with a projection 94a. The other end of the spring 70 is indicated at 70b and engages the projection 94a to constrain the washer 94 toward movement in the direction of the arrow b of Figure 3.

The washer 68 is provided with a lug 68b while the washer 94 is provided with a lug 94b. These lugs overhang the cam 66 and are adapted to be engaged by the lobe 72 thereof at times in order to manually rotate the washers 68 and 94 when desired.

PRACTICAL OPERATION

*1. Normal operation*

Position No. 5 in Figure 8 is the factory setting. The knob 16 is provided with an arrow 16a and a web 16b to indicate the positions at which the knob is set. For instance, in the position of Figure 1, the knob 16 is approximately at No. 5 position. With the switch set for neither defrosting nor quick freezing operations, this position will give automatic control between normal predetermined limits. If a warmer than normal temperature is desired, the knob may be adjusted to No. 2, No. 3 or No. 4. If a colder than normal temperature is desired, the knob may be adjusted to No. 6, No. 7 or No. 8.

*2. Defrosting operation each cycle*

Figure 3:
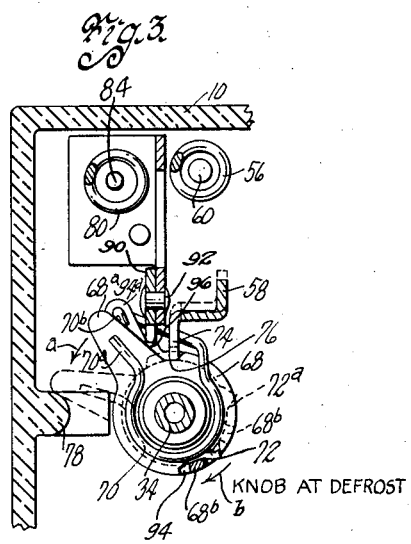
Figure 3 is a sectional view on the line 3—3 of Figure 2, showing a defroster and quick freeze cam and levers and the mechanism with which they are used.

For obtaining a defrosting cycle each cycle of the operation of the switch structure, the arrow 16a on the knob 16 is turned from the position shown in Figure 8 in the direction of the arrow b in Figure 3 to the position designated "Defrost" in Figure 8. This causes the lobe 72 of the cam 66 to move from the position indicated at 72a in Figure 3 to the position indicated at 72 therein. In doing this the lobe 72 first engages the lug 68b of the washer 68, moving it from its dotted line position of Figure 3 to its solid line position. The extension 68a and the depression 76 of the washer 68 are thus also moved from their dotted line positions to their full line positions, thereby allowing the extension 74 on the defroster lever 58 to move from its dotted line position to its full line position due to the action of the spring 56 to impose the tension of the spring 56 on the switch arm 20 (full line position of Fig. 2) at the high temperature end of its movement.

*3. Single defrosting cycle*

For obtaining only a single defrosting cycle of operation the knob 16 is first adjusted to the defrost position as just described for defrosting operation each cycle of operation of the switch and it is then adjusted to No. 2, No. 3 or No. 4, depending on whether it is desired to defrost at the higher temperature of No. 2, the intermediate temperature of No. 3 or the lower temperature of No. 4.

After the single defrosting cycle is completed the bellows 18 will move the switch arm 20 and will thereby move the lever 58 to the dotted line position of Figure 3 so that the washer 68 is no longer retained by the end 74 of the lever 58 in the full line position, thus permitting the washer 68 to be rotated by the spring 70 to the dotted position with the arm 68a thereof engaging the stop 78. Thereafter the end 74 will engage the periphery of the washer 68 when the bellows contracts to a position permitting the lever 58 to swing downward slightly under the influence of its spring 56. In this manner the defrosting spring 56 will no longer be effective until the switch is set for defrosting operations.

*4. Manually tripping the switch to obtain normal operations after it has been set for defrosting operations*

Figure 4:
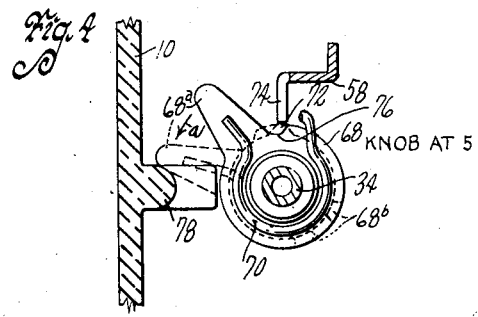
Figure 4 is a view similar to a portion of Figure 3 showing only the defroster cam and lever mechanism.

To manually trip out the switch after it has been set for defrosting operations, the knob 16 is rotated to position No. 5 as shown in Figure 4, in which the cam lobe 72 has raised the defroster lever 58, thus permitting the spring 70 to swing the washer 68 from its full line position to its dotted line position after which the defrosting cycles will not occur until the switch is again set for defrosting.

Besides serving in the position of No. 5 as a manual means to discontinue the defrosting operations, defrosting operations are prevented by adjusting the switch to position No. 5, No. 6, No. 7 or No. 8 which positions adjust the spring 32 for a temperature of operation too low to obtain effective defrosting.

5. Quick freezing operation each cycle

To obtain a quick freeze cycle each cycle of operation of the switch the knob 16 is adjusted as in the direction of the arrow c to the quick freeze position, as shown by solid lines in Figure 6. The position of the parts when the knob is at No. 8 is shown by dotted lines. The solid lines indicate that the cam 72 has engaged one side of the lug 94b and thereby moved the washer 94 so that the lever 90 has dropped from the cam lobe 96 thereof to the periphery of the washer, thus permitting the spring 80 to extend and hold the hook 86 in engagement with the left end of the slot 88 as in Figure 5. The dotted line position of Figure 5 shows the switch lever 20 in its low temperature position with the quick freeze spring 80 (also in dotted position) loading it so that the temperature affecting the temperature responsive element must go lower than normal in order to trip the switch to circuit breaking position.

6. Single quick freeze cycle

If only a single cycle of quick freeze operation is desired, then the knob 16 can be adjusted to any of the positions from No. 2 to No. 8 after turning it to the quick freeze position. This has the effect of moving the cam 72 away from the lug 94b so that the washer 94, (which is held in the quick freeze position by the spring 80 causing the lever 90 to frictionally engage the periphery of the washer 94) will swing back in the direction of the arrow d to its dotted line position of Figure 6 by the action of the spring 70 upon the switch spring 32 moving the arm 20 to assume its low temperature position and thereby raising the lever 90 to the dotted line position of Figure 6. When in this position, of course, it will be seen that there will be no further quick freeze cycles until the switch is adjusted for such.

7. Manually tripping the switch to obtain normal operation after it has been set for quick freezing operations To manually reset the switch for normal operation after setting it for quick freezing operation, the knob 16 may be moved as in the direction of the arrow e to the defrost position as in Figure 7, which causes the cam lobe 72 to engage the other side of the lug 94b and swing the washer 94 from the dotted line position of Figure 7 to full line position. In this position the end of the pivoted lever 90 adjacent the cam 94 is held raised by the cam lobe 96 to eliminate quick freezing cycles. Then, if defrosting is not desired, the knob 16 can be moved to the normal position (No. 5) for rendering defrosting cycles inoperable as already described, and thereafter to any of the Nos. 2, 3, 4, 6, 7, or 8 positions as desired.

By the disclosed arrangement of mechanism in my switch structure, it is possible to secure a selection of temperatures for the defrosting and quick freezing cycles of operation. This makes it unnecessary to provide compensation for the changed tension of the range adjusting spring 32 as when the knob 16 is adjusted to defrost or quick freeze positions. There is a maximum selection for control—defrost and quick freeze cycles can be obtained continuously or for one cycle and then the switch automatically returns to normal operation at the setting to which the knob has been turned after turning it to defrost or quick freeze positions.

It is also possible to adjust the switch out of the defrost or the quick freeze position if after once setting it there the operator changes his mind for any reason.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. For use with a control mechanism including a cyclically operated movable member, an adjustable means for adjusting the normal range thereof, means in addition to said adjustable means for modifying the operation of a device controlled by said control mechanism to secure a temporary abnormal operating cycle comprising a resisting member adapted only upon movement of said adjustable means in one direction beyond the range for normal operation to resist movement of said movable member for securing said abnormal cycle of operation and means in addition to said adjustable means for modifying the operation of said device to secure a temporary subnormal operating cycle comprising a second resisting member adaptable only upon movement of said adjustable means in the other direction beyond adjustment of the range for normal operation to resist movement of said movable member for securing said subnormal cycle of operation, each of said means in addition to said adjustable means being operable by the adjustable means in different positions thereof and being again inoperable by the adjustable means in other positions thereof.

2. In combination with an automatically movable member and manually adjustable means movable between predetermined limits to vary the range thereof, mechanism for modifying the cycles of operation of said automatically movable member comprising a resisting member selectively movable to operative and inoperative positions, said manually adjustable means being operatively associated therewith to render it operative to modify said cycles of operation in one position of the manually adjustable means, to render it inoperative in another position thereof and to render it operative through only a single cycle in other positions thereof, a second resisting member selectively movable to operative and inoperative positions, said manually adjustable means being operatively associated therewith to render it operative to differently modify said cycles of operation in one position of the manually adjustable means, to render it inoperative in another position thereof and to render it operative through only a single cycle in other positions thereof.

3. Mechanism for modifying the operation of an automatically movable member comprising an actuating member for engagement therewith but normally spaced therefrom, a spring to constrain said actuating member to engage said automatically movable member, a cam having a lobe normally engaging said actuating member to prevent such engagement and a portion lower than said lobe to register with said actuating member to permit such engagement and a control member operable through a limited path of travel and adapted at one end of its limited path of travel to cause registration of said lobe with said actuating member and in another position of its travel to remove said lobe from registration with said actuating member, said control member being connected with said cam by a lost motion connection whereby said control member can be adjusted over a substantial range of its travel before it removes said lobe from registry with said actuating member.

4. For use with a control mechanism including a cyclically operated movable member, an adjustable means for adjusting the normal range thereof, means in addition to said adjustable means for modifying the operation of the device controlled by said control mechanism to secure a temporary subnormal operating cycle comprising a resisting member adapted only upon movement of said adjustable means beyond adjustment of the range for normal operation to resist movement of said movable member for securing said subnormal cycle of operation and upon movement of said adjustable means back to another position to render said resisting member ineffective to resist movement of said movable member, said adjustable means being connected with said resisting member by a lost motion connection whereby said adjustable means can be adjusted over a substantial range before it renders said resisting member ineffective.

5. For use with an automatic control device having an alternately oppositely movable member, means to prolong the movement of said movable member in one direction comprising a spring loaded member to be engaged by said movable member, a second means to prolong the movement of said movable member in the other direction comprising a second spring loaded member to be engaged by said movable member and manually operable means to set and retain either one of said means in position to be engaged thereby during a latter part only of the movement of the movable member to prolong its movement during such part or to set and retain it in position spaced therefrom, whereby movement of the movable member is not so prolonged, said manually operable means being associated by a lost motion connection with said spring loaded members to render the operative one of them inoperative if desired after it has been rendered operative.

6. Mechanism for modifying the operation of an automatically movable member comprising an actuating member for engagement therewith but normally spaced therefrom, a spring to constrain said actuating member toward engaging position when said movable member is at one limit of its travel, a second actuating member for engagement therewith but normally spaced therefrom, a second spring to constrain said second actuating member to engage said movable member at the other limit of its travel and manually operable means for permitting either one of said springs to function, said manually operable means being associated by a lost motion connection with said spring loaded members to render them inoperative if desired after they have been rendered operative thereby.

7. A circuit controlling device comprising a switch member operable between open and closed circuit positions, an operating member operable in both directions through a predetermined path for operating said switch member between open and closed circuit positions, a pair of individually movable members, means mounting said members for movement into the path of said operating member, separate biasing means associated with each of said members for constantly biasing said individually movable members toward said operating member, selective means normally maintaining said members out of said path of said operating member but operable to permit movement of one member in accordance with its bias into a position to oppose movement of said operating member in one direction and to permit movement of said other member in accordance with its bias into a position to oppose movement of said operating member in the other direction.

MALCOLM E. HENNING.